(12) United States Patent
Grobben

(10) Patent No.: US 11,447,344 B2
(45) Date of Patent: Sep. 20, 2022

(54) SORTING SYSTEM

(71) Applicant: Vanderlande Industries B.V., Veghel (NL)

(72) Inventor: Koen Maarten Geert Grobben, Veghel (NL)

(73) Assignee: Vanderlande Industries B.V., Veghel (NL)

( * ) Notice: Subject to any disclaimer, the term of this patent is extended or adjusted under 35 U.S.C. 154(b) by 0 days.

(21) Appl. No.: 17/262,360

(22) PCT Filed: Jul. 25, 2019

(86) PCT No.: PCT/NL2019/050488
§ 371 (c)(1),
(2) Date: Jan. 22, 2021

(87) PCT Pub. No.: WO2020/022896
PCT Pub. Date: Jan. 30, 2020

(65) Prior Publication Data
US 2021/0284464 A1  Sep. 16, 2021

(30) Foreign Application Priority Data
Jul. 25, 2018 (NL) .................................. 2021393

(51) Int. Cl.
*B65G 43/08* (2006.01)
*B65G 47/82* (2006.01)
(Continued)

(52) U.S. Cl.
CPC ............... *B65G 43/08* (2013.01); *B07C 3/08* (2013.01); *B65G 47/50* (2013.01); *B65G 47/82* (2013.01);
(Continued)

(58) Field of Classification Search
CPC ........ B65G 43/08; B65G 47/50; B65G 47/82; B65G 2203/0233; B65G 2203/0291; B65G 2203/042; B65G 2203/044; B07C 3/08
(Continued)

(56) References Cited

U.S. PATENT DOCUMENTS 5,927,465 A * 7/1999 Shearer, Jr. .......... B65G 47/844
198/370.02
6,041,909 A 3/2000 Shearer, Jr.
9,540,184 B2 * 1/2017 Groot .................. B65G 47/844

FOREIGN PATENT DOCUMENTS

CN 107108130 A * 8/2017 ......... B65G 47/1471
WO 2007133672 A2 11/2007
(Continued)

OTHER PUBLICATIONS

The International Search Report dated Oct. 18, 2019 issued in corresponding PCT Appln. No PCT/NL2019/050488.

*Primary Examiner* — Gene O Crawford
*Assistant Examiner* — Lester Rushin, III
(74) *Attorney, Agent, or Firm* — Carter, DeLuca & Farrell LLP

(57) ABSTRACT

Sorting system for sorting products as well as method for application thereof. The sorting system comprises a central control system and a number of combinations of an elongated carrying body and a pusher body. The carrying bodies extend parallel to each other and are each configured for carrying a product to be sorted. The sorting system further comprises a displacing device for moving the combinations. Each combination is further provided with a further displacing device that is provided with an on-board driving device for moving the pusher body in a sorting direction along the carrying body for pushing a product carried by the carrying body off of the carrying body with the pusher body, as well (Continued)

as with an on-board control system that is configured for receiving destination data emanating from the central control system and for driving the on-board driving device hereto. The sorting system further comprises a distance-determining device that is configured for determining a distance parameter that is related to the, or at least a, distance between a pusher body and a product to be sorted and for sending the distance parameter to the on-board control system. The on-board control system is configured for controlling the on-board driving device of the combination on the basis of this distance data.

25 Claims, 8 Drawing Sheets

(51) Int. Cl.
    *B07C 3/08*         (2006.01)
    *B65G 47/50*     (2006.01)

(52) U.S. Cl.
    CPC ............... *B65G 2203/0225* (2013.01); *B65G 2203/0233* (2013.01); *B65G 2203/0291* (2013.01); *B65G 2203/042* (2013.01); *B65G 2203/044* (2013.01)

(58) Field of Classification Search
    USPC ........................................................ 198/358
    See application file for complete search history.

(56) References Cited

FOREIGN PATENT DOCUMENTS

| | | |
|---|---|---|
| WO | 2009015173 A1 | 1/2009 |
| WO | 2013048245 A1 | 4/2013 |

\* cited by examiner

SORTING SYSTEM

CROSS-REFERENCE TO RELATED APPLICATION

This application is a National Stage Application under 35 U.S.C. § 371(a) of PCT/NL2019/050488, filed Jul. 25, 2019, which claims the benefit of and priority to Netherlands Patent Application No. 2021393 filed Jul. 25, 2018. The entire contents of all of the foregoing applications are incorporated by reference herein.

SUMMARY

The present invention relates to a sorting system for sorting products comprising a central control system, a number of successive combinations, located one after another, of an elongated carrying body and a pusher body movable in a direction of movement following a path along which a number of sorting locations are provided, wherein the carrying bodies extend parallel to each other and perpendicular to the direction of movement and each one of the carrying bodies is configured for carrying a product to be sorted, the sorting system further comprising a displacing device for moving the combinations in the direction of movement along the path, each combination further being provided with a further displacing device that is provided with an on-board driving device for moving the pusher body in a sorting direction along the carrying body, extending perpendicularly to the direction of movement, for pushing a product carried by the carrying body off of the carrying body with the pusher body, as well as an on-board control system that is configured for receiving destination data emanating from the central control system relating to the sorting location where a product to be sorted should be pushed off of the carrying body and for driving the on-board driving device hereto.

In the European document EP 1422173 A1, a sorting system of this kind is described as an alternative to sorting systems wherein pusher bodies are pushed along respective carrying bodies by configuring the pusher bodies on the underside with a wheel or the like that follows or at least may follow a stationary guide under the carrying bodies so as to be led during and on account of the movement of a carrying body in the direction of movement from one end of a carrying body to an oppositely located end. The sorting system described is configured with pusher bodies that also form a housing for a direct-current motor and for a control system for controlling the motor and thus for controlling the movement of the respective pusher body in a sorting direction along elongated parallel carrying bodies, which also form a carrying surface for products to be sorted. The carrying bodies and the pusher bodies move in operation with a speed of movement in a direction of movement transverse to their longitudinal direction and thus transverse to the sorting direction. For each pusher body, a band is provided that extends between end faces of a carrying body and which is passed round a drive wheel that is mounted rotatably in the housing. The drive wheel is coupled to the motor. The aforementioned document describes the option of configuring the pusher bodies with a sensor, for example such as an infrared sensor or a proximity switch. Based on signals received from such a sensor, an associated motor would then be activated so that the pusher body moves with a sorting speed in the sorting direction relative to the carrying bodies and during this movement, sorts a product by pushing it at the site of a desired sorting location off of the carrying bodies.

The sorting system described above has the drawback that it is not suitable or not very suitable to be operated at higher speeds of movement, for example typically above 2.5 metres per second. Thus, starting from an identical sorting speed, a higher speed of movement has the result that the sorting locations that are provided along the path of the carrying bodies must be longer. At a higher speed of movement, the carrying bodies will always have travelled a longer distance in the time that the projection of a pusher body in the sorting direction requires over the carrying surface. Longer sorting locations have the result that the sorting system requires more space, which is problematic. A logical solution to this problem would be to increase the sorting speed as well. However, this leads to the problem that products to be sorted are then damaged by the pusher bodies on account of the larger force that the pusher bodies will exert on the products to be sorted at least as the pusher bodies come into contact with a product to be sorted.

The present invention aims to provide a sorting system as described at the beginning with which a solution to or at least improvement is offered for the above problems. More specifically, the invention aims to provide a sorting system that can be operated with a higher speed of movement wherein the space for the sorting system is used efficiently and in addition the risk of damage to products to be sorted as a result of sorting can remain limited. For this purpose, the invention provides a sorting system as described at the beginning that further comprises a distance-determining device that is configured for determining a distance parameter that is related to the, or at least a, distance viewed in the sorting direction between a pusher body of a combination, of which the carrying body carries a product to be sorted and the product to be sorted carried by the carrying body and for sending the distance parameter to the on-board control system and wherein the on-board control system is configured for controlling the on-board driving device of the combination on the basis of this distance data.

In this document the term "on-board" means that the component or the components to which the term "on-board" relates form part of a combination of a carrying body and a pusher body in the sense that the respective component or the respective components move together with the combination in the direction of movement. The term "off-board", which will also be used in this document, means that the component or the components to which the term "off-board" relates do not form part of the aforementioned combination and consequently do not move together with the combination in the direction of movement.

The feature that each combination of a carrying body and a pusher body is provided with an on-board control system does not exclude that such on-board control system are of different types for different combinations. It is for example possible that in a regular pattern some combinations, for example one out of five, are provided with an on-board control system of a master type and the other on-board systems of the other combinations are of a slave type. The on-board system of the slave type will or at least can in use receive information, such as destination data, from a neighbouring on-board control system of the master type which latter control system receives such information from the central control system.

In the foregoing there is the expression "the, or at least a, distance" between a pusher body and a product to be sorted viewed in the sorting direction. This takes into account the situation in which the side of a product facing a pusher body has a longitudinal direction that makes an angle with the direction of movement and/or that the respective side is not rectilinear. Taking into account that a pusher body viewed in the direction of movement has a certain length, in such cases we cannot speak unambiguously about "the" distance, since the distance varies depending on the position on the pusher body viewed in the direction of movement where the distance in question is measured.

The aforementioned term "distance parameter" may coincide with the absolute value of the distance but this is not necessary. In the context of the invention the parameter may for example also be expressed in categories, for example the categories 1) a distance greater than x cm, 2) a distance less than x cm and 3) a distance equal to 0 cm. In the last category, the pusher body is thus up against the product to be sorted. Thus, in the present document it is not exclusively a question of the absolute value of the aforementioned distance between a pusher body and a product to be sorted, but may also be a matter of assigning the respective distance to categories, for example two, three, four or five categories.

The measure that the distance-determining device is configured for sending the distance parameter to the on-board control system should not be interpreted so restrictively that the distance-determining device necessarily sends the distance parameter directly to the on-board control system. This may also take place indirectly, for example via the central control system. In this kind of indirect situation there may also be an intermediate unit, such as the central control system, which processes the distance parameter into a control signal for the on-board control system. What is important is that the on-board control system ultimately operates at least partly on the basis of the distance parameter.

Application of the sorting system according to the invention with a distance-determining device that can generate information in the form of the distance parameter over the distance between a product to be sorted and a pusher body, and based on this information the on-board driving device can be controlled by the on-board control system, offers the important advantage that the movement of the pusher body in the sorting direction can be monitored in such a way that even at a relatively high speed of movement, for example above 2.5 metres per second, the risk of damaging the product to be sorted is relatively low and the sorting system can nevertheless be relatively compact. More specifically, contact between the pusher body and the product to be sorted can occur at a relatively low speed.

According to a possible embodiment, the distance-determining device is also configured for determining an orientation parameter that is related to the orientation of the product to be sorted carried by the carrying body relative to the direction of movement, wherein the on-board control system is configured for controlling the on-board driving device of the combination on the basis of this orientation parameter. Control of this kind may for example be directed at manipulating a product to be sorted that in top view is rectangular, such as typically a box, and whose sides form an angle with the direction of movement by means of the pusher bodies, in such a way that two oppositely-located straight sides of the product to be sorted extend parallel to the direction of movement and thus occupy as little space as possible viewed in the direction of movement. Alternatively said control may also be such that a product to be sorted just makes an angle with the direction of movement, said angle matching the angle at which a discharge conveyor, such as a chute, at the site of a sorting location, makes with the path of the carrying bodies.

If the distance-determining device comprises, for at least some of the combinations, an on-board distance-determining device that is provided with a sensor assembly with at least one sensor, said on-board distance-determining device being configured for determining the distance parameter and for sending the distance parameter directly to the on-board control system, it is possible to make the distance parameter known to the on-board control system in a reliable manner. If use were to be made of an off-board distance-determining device, which is not excluded in the context of the present invention, there is an increased risk that transfer of the distance data from the off-board distance-determining device to the on-board control system might fail.

For accuracy, it may be favourable if the distance-determining device comprises an on-board distance-determining device for each combination. The sensor of the sensor assembly of the on-board distance-determining device of a combination may form part both of the pusher body of the combination and of the carrying body of the combination. Power supply to the sensor may as a rule be accomplished more easily in the latter case. Especially if the on-board control system is provided in or on the pusher body, and thus moves together with the pusher body in the sorting direction, data transfer between the on-board distance-determining device and the on-board control system may take place in a very reliable and constructionally simple manner, hard-wired.

In particular, in order to be able to determine, apart from the, or at least a, distance between a pusher body and a product to be sorted, also to determine the orientation of the product to be sorted, it may be preferable if the sensor assembly of an on-board distance-determining device of a combination comprises at least two sensors, which are provided one after another, viewed in the direction of movement. If by means of the two sensors the same distances are determined between the pusher body and the product to be sorted, this is an indication that the product is oriented parallel to the direction of movement. If the distances differ from one another, this may indicate that the orientation of the product is crooked. If one of the two sensors does not measure any distance, this may indicate that the two sensors are located at the front or at the rear, viewed in the direction of movement of the product to be sorted.

In a further embodiment, the sensor assembly of an on-board distance-determining device of a combination comprises at least two sensors, which, viewed in a direction parallel to the sorting direction, are provided on two oppositely-located sides of the pusher body of the combination. Thus, it is also possible to determine the distance parameter between on the one hand the pusher body and on the other hand the product to be sorted regardless of on which side of the pusher body, viewed in the sorting direction, the product to be sorted is located.

In order to obtain more freedom regarding the position of the sensor, it may be advantageous if the sensor assembly of an on-board distance-determining device belonging to a combination is also provided with a mirror body with at least one mirror surface for reflecting, in the direction of the or at least a sensor of the sensor assembly, a signal received from a product to be sorted carried by the carrying body.

More specifically, the sensor assembly may be provided with a mirror body with at least two mirror surfaces or with two mirror bodies each with at least one mirror surface, wherein two mirror surfaces of the at least two mirror surfaces are configured for reflecting signals received from two opposite directions extending parallel to the sorting direction. Thus, the sensor assembly may be suitable for determining the distance between a product to be sorted and the pusher body regardless of on which of two oppositely-located sides, viewed in the sorting direction, the product to be sorted is located relative to the pusher body.

An effective and reliable determination of the distance can be obtained if the mirror body, the mirror bodies or some of the mirror bodies of the sensor assembly of an on-board distance-determining device belonging to a combination, form part of the pusher body of the combination. The respective mirror bodies then move together with the pusher body in the sorting direction.

A reliable distance determination may further be obtained if the sensor assembly of an on-board distance-determining device belonging to a combination is provided with a light source for emitting a light signal to a product to be sorted carried by the carrying body of the combination. Based on the duration of the, for example, wave-shaped or pulse-shaped light signal, which may also be a light signal in the infrared region, it is possible to determine the distance between the pusher body and the product to be sorted.

It is also possible that each on-board distance-determining device of a combination comprises an on-board position-determining unit, which is configured for determining a position parameter that is related to the position viewed in the sorting direction of the pusher body of the combination relative to the carrying body of the combination and for sending the position parameter to the on-board control system and wherein the on-board distance-determining device comprises presence sensors that form part of the carrying body of the combination and are provided, distributed over the length of the carrying body, in at least one row, said presence sensors being configured for detecting whether a product to be sorted is positioned on the carrying body at the site of the respective presence sensor and for sending presence data relating to the presence of a product to be sorted at the site of the respective presence sensor to the on-board control system wherein the distance-determining device is configured for determining the distance parameter based on the presence data as well as the position parameter. With an embodiment such as this, use may be made of relatively simple, and therefore reliable, sensors, which only need to be able to determine whether or not a product is present at a certain position. The on-board position-determining unit may moreover also be operative on the basis of the presence sensors.

To be able to determine the orientation of the product to be sorted as well, the presence sensors may be provided in at least two parallel rows.

The presence sensors may for example be pressure sensors, which are pressed in at the moment that a product comes to rest on them.

Alternatively, the presence sensors may also be light sensors.

The accuracy with which the distance between a product to be sorted and a pusher body can be determined will, when using presence sensors, such as those discussed above, depend in particular on the distance between adjacent presence sensors in a row. To achieve an accuracy that is sufficient in practice, the average distance between adjacent presence sensors in a row is at most 6 cm. The distances between adjacent presence sensors in a row are in addition preferably equal to each other.

The centre to centre distance of adjacent carrying bodies viewed in the direction of movement may advantageously be between 10 cm and 40 cm. The optimum dimensions will also depend on the (average) dimensions of the products to be sorted.

Alternatively, for an on-board distance-determining device, in the invention the distance-determining device may also comprise an off-board distance-determining device that is installed along the path, said off-board distance-determining device being configured for determining a distance parameter and for sending the distance parameter to the on-board control system.

The off-board distance-determining device may then preferably comprise a camera, which is installed above the path.

The invention also provides a method of using a sorting system according to the invention as described above. This method comprises the steps of supplying a product to be sorted to the sorting system so that the product to be sorted is carried by at least two adjacent carrying bodies of associated combinations, receiving, by the on-board control systems of the combinations of the central control system, of destination data relating to the sorting location where the product to be sorted should be pushed off by the pusher bodies from the combinations of the carrying body of the combinations, determination of distance parameters by the distance-determining devices, sending of distance parameters by the distance-determining devices to the on-board control systems, controlling of the on-board drive devices of the combinations by the on-board control systems based on the distance parameters in such a way that each pusher shoe of the combinations moves successively during a first phase in the sorting direction towards the product to be sorted, comes into contact with the product to be sorted during a second phase and pushes off the product to be sorted in the sorting direction from the associated carrying body during a third phase.

To reduce the risk of the product to be sorted being damaged on account of coming into contact with a pusher shoe during the second phase, it may be advantageous for the speed with which the pusher shoe comes into contact with the product to be sorted during the second phase to be less than or equal to 1.5 m/sec, preferably less than or equal to 1.0 m/sec.

In particular at higher speeds of movement, for example above 1.5 m/sec, it may be advantageous for the maximum speed of the pusher shoe viewed in the sorting direction during the third phase to be greater than the speed with which the pusher shoe comes into contact with the product to be sorted during the second phase. This entails acceleration of the pusher shoe during the third phase. Owing to the aforementioned higher speed In particular from the viewpoint of aiming for a limited energy consumption, it may moreover be advantageous if the pusher shoe viewed in the sorting direction during the third phase is greater than the maximum speed of the pusher shoe viewed in the sorting direction during the first phase.

In terms of control engineering and energy engineering, it may be advantageous if the on-board control systems, based on the distance parameters, control the on-board drive devices of the combinations in such a way that at least one of the pusher shoes of the combinations is stationary relative to the associated carrying body either between the start of the first phase and the second phase, or between the second phase and end of the third phase.

BRIEF DESCRIPTION OF THE DRAWINGS

The invention will be explained in more detail hereunder on the basis of the description of a number of possible embodiments of the invention, referring to the following figures.

DETAILED DESCRIPTION

Figure 1:
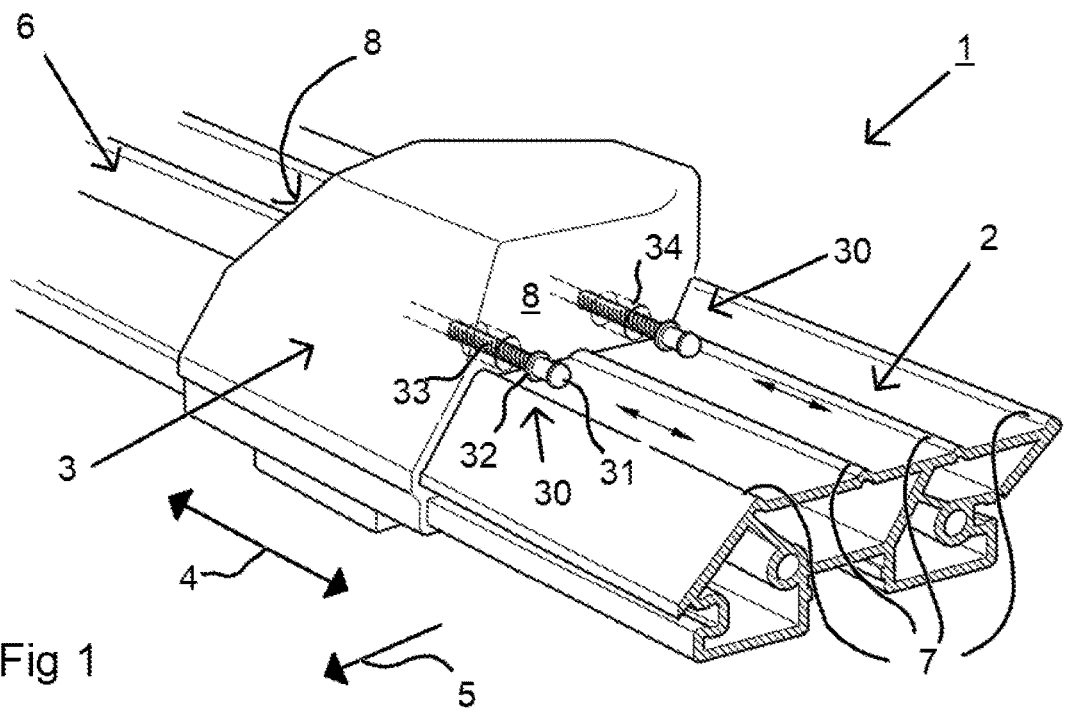
FIG. 1 shows a perspective view of a combination forming part of a sorting system according to the invention.
Figure 6:
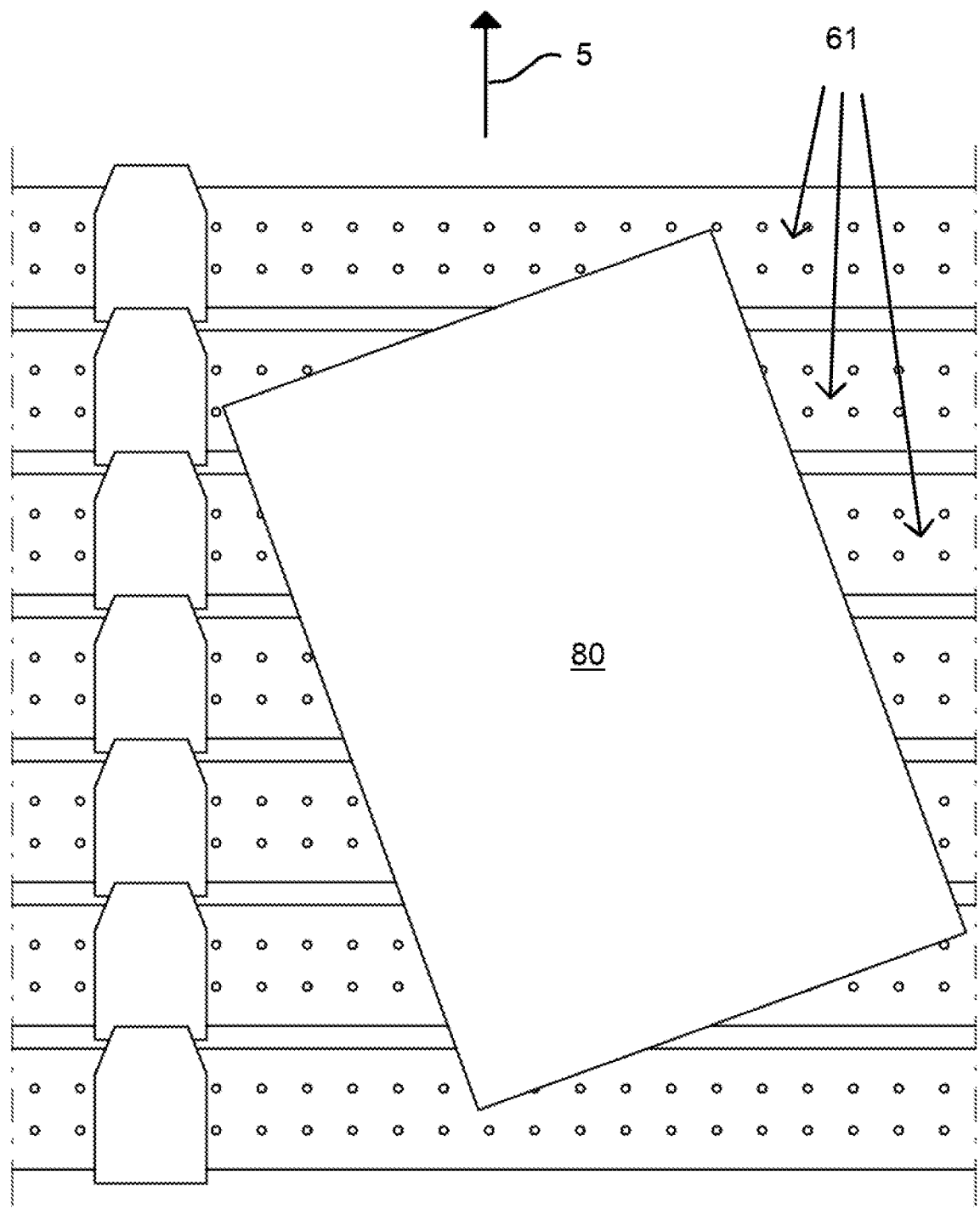
FIG. 6 shows a top view of a number of combinations located one after another, each of a carrying body and a pusher body.

FIG. 1 shows a combination 1 of an elongated carrying body 2, to be denoted hereinafter with the term slat, and a pusher body 3, to be denoted hereinafter with the term pusher shoe. Pusher shoe 3 is movable to and fro along slat 2 in two opposite sorting directions according to double-headed arrow 4 that extends parallel to the longitudinal direction of slat 2, in a manner that will be explained in more detail on the basis of FIGS. 2 and 3. Combination 1 is one of a large number of identical combinations which together form a closed circuit and form part of a sorting system. The slats 2 extend parallel to each other for example as is also shown in FIG. 6. The closed circuit comprises an upper part and a lower part located directly thereunder. The upper part and the lower part extend as horizontal surfaces with a length of typically tens of metres. The upper part and the lower part are joined to each other at their ends via semi-arcuate parts of the closed circuit.

The slats 2 are each coupled together at their ends via chains that also run along the closed circuit. Gears engage with the chains at least at the site of the arcuate parts of the closed circuit. At least some of these gears are driven by one or a number of electric motors so that the successive combinations 1 can be moved in a direction of movement 5 that extends perpendicular to the sorting directions 4, along an endless transport path that is of identical shape to the shape of the closed circuit of the combinations 1. The sorting process, which is to be explained in more detail, takes place at the site of the upper part of the transport path. The respective part of the transport path is indicated with the term sorting path and has an upstream end and a downstream end. This manner of driving combinations of slats and pusher shoes is familiar to a person skilled in the art and therefore does not require further detailed description here. For illustration, reference may be made for example to the documents EP 559303 A2 and EP 2346755 A1. In addition, reference may be made to the document WO 2009/067110 A2, which describes a variant of a sorting device with combinations of slats and pusher shoes, wherein chains are not used for joining slats together. The present invention is for example also applicable to a sorting device of that kind.

Slat 2 is an extruded aluminium profile and is provided on the upper side, at least in FIG. 1, which shows combination 1 in a position in the sorting path, with a carrying surface 6 with four equally spaced carrying ribs 7 extending in the longitudinal direction of slat 2, for a product to be sorted to be carried thereon, such as parcel 80 in FIG. 6. Pusher shoe 3 has a passage through which slat 2 extends. With regard to design, this passage of pusher body 3 connects to the perimeter of slat 2 so that slat 2 forms a longitudinal guide for pusher body 3 during the movement to and fro of pusher body 3 relative to slat 2 in a sorting direction 4. Above slat 2, pusher body 3 is provided with two oppositely-located, vertically oriented, pusher surfaces 8.

In use, a product to be sorted, such as parcel 80 in FIG. 6, is supplied at the site of the upstream end of the sorting path, to a combined carrying surface such as is formed by a number of successive carrying surfaces 6 located one after another. This combined carrying surface supports the product 80 during movement of the respective combinations 1 in the direction of movement 5. The respective product 80 is intended, at the site of a sorting location, where typically a chute or roller table is provided along the path of the combinations 1, to be pushed off of the combined carrying surface by means of the pusher shoes 3 that form part of the associated combinations 1. Logically, the product to be sorted is located on the sides of the pusher bodies 3 positioned at the respective sorting location. The central control system of the sorting system is in possession of data relating to the aforementioned sorting location for the respective product to be sorted 80.

Each combination 1 is provided with an on-board driving device for being able to move the pusher body 3 relative to the slat 2 to and fro in the sorting direction 4. Two possible embodiments of such an on-board driving device, not to be regarded as limiting the invention, are described on the basis of FIGS. 2 and 3.

Figure 2:
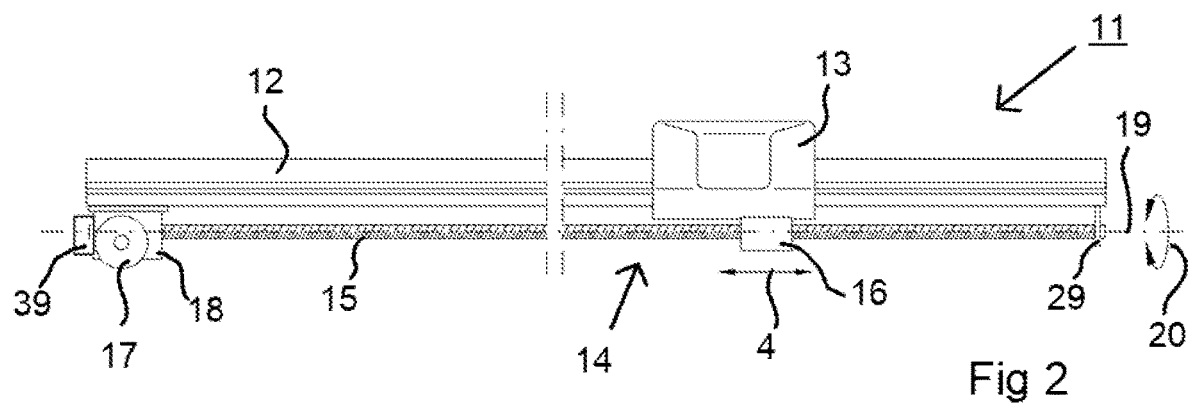
FIG. 2 shows a side view of a pusher body.

In FIG. 2, it is a matter of a combination 11 of a slat 12 and a pusher shoe 13 movable relative to slat 12 to and fro in two opposite sorting directions 4. For said movement, combination 11 is provided on the underside of slat 12 with a spindle transmission 14 with a threaded spindle 15 and a nut 16 that surrounds threaded spindle 15 and engages therewith. Nut 16 is connected to pusher shoe 13, on the underside thereof. The on-board driving device further comprises a servomotor 17 which, via right-angled transmission 18, connected rigidly with slat 12 to one end thereof, is coupled to one end of threaded spindle 15. At the oppositely located end, threaded spindle 15 is mounted rotatably in bearing body 29, which is connected rigidly to slat 12. Excitation of servomotor 17 results in threaded spindle 15 rotating about centre line 19 in one of the two directions according to double-headed arrow 20. Nut 16 is moved thereby in a sorting direction 4. On account of the coupling between nut 16 and pusher shoe 13, pusher shoe 13 will therefore also move in one of the two oppositely directed sorting directions 4, parallel to the longitudinal direction of slat 12.

Figure 3:
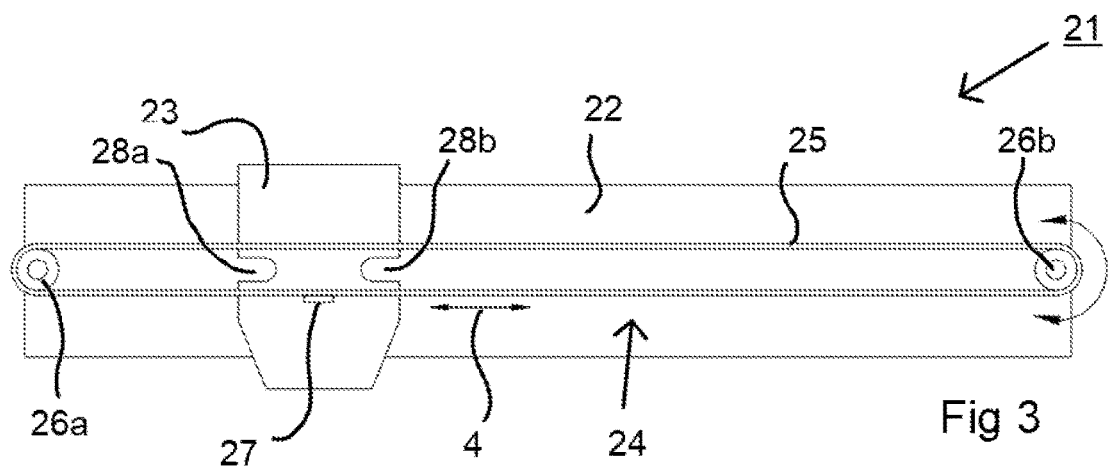
FIG. 3 shows a bottom view of a combination of a carrying body and a pusher body.

Combination 21 according to FIG. 3 comprises a slat 22 and a pusher shoe 23 movable relative to slat 22 to and fro in a sorting direction according to double-headed arrow 4. On the underside of slat 22, combination 21 is provided with a belt transmission 24 with a belt 25 that is passed round deflection pulleys 26a, 26b, which are connected rotatably about their respective centre lines via shaft bodies, not shown in more detail, to slat 22, on the underside thereof, as well as to the two oppositely-located ends thereof. One of the two deflection pulleys 26a, 26b is drivable by means of a servomotor, not shown in more detail, such as servomotor 17, whether or not via a transmission. Belt 24 is connected to pusher shoe 23, on the underside thereof, by means of connecting piece 27. In pusher shoe 23, at least on the underside thereof, two U-shaped recesses 28a, 28b are provided, in which the aforementioned shaft bodies may be located if pusher shoe 23 is in one of the two outer states, left and right in FIG. 3.

Alternatively, for driving a pusher shoe relative to a slat, it is also broadly speaking possible for a servomotor to be provided in or on the pusher shoe, for example in a manner that is comparable to the manner in which a direct-current motor is connected to a pusher shoe as described in EP 1422173 A1.

Servomotor 17 belonging to the on-board driving device of combination 11 according to FIG. 2 and the servomotor belonging to the on-board driving device of combination 21 according to FIG. 3 may be supplied with power by means of a battery, not shown in more detail. Charging of such a battery may for example be inductive, and thus contactless, or by means of sliding contacts.

For controlling the aforementioned servomotors, each combination is also provided with an on-board control system 39, which in the selected example according to FIG. 2 is fixed to the housing of the right-angled transmission 18. The on-board control system may for example be configured as a microprocessor or a Field Programmable Gate Array (FPGA). The on-board control system 39 is configured for at least receiving data, for example directly from the central control system, relating to the sorting location where a product to be sorted 80 should be pushed from the associated slat and relating to the position of the combination viewed in the direction of movement at least in the sorting path, and for controlling the associated servomotor 17. For supplying data relating to the position of the combination viewed in the direction of movement, it is for example possible for a central control system of the sorting system to emit a signal with a certain frequency that is received by the on-board control systems of all combinations, or at least of all combinations within the sorting path, said signal being representative of the distance travelled by the combinations in the direction of movement since the previous signal. The on-board control system is further configured with a ROM and/or RAM memory for storing data relating to the aforementioned sorting location and for determining the longitudinal position of the pusher shoe relative to the associated slat. Data transfer between the central control system and the on-board control system 39 may be wireless, for example by means of a so-called leaky coax system wherein a leaky coax cable extends along the path of the combinations 11, 21, at least over the length of the sorting path and preferably on the side of the combinations 11, 21 where the associated on-board servomotor is positioned. The power supply of the on-board control system 39 may take place in the same way as for the servomotor 17. In an alternative embodiment the on-board control system 39 may also be connected to a pusher shoe and move together with it in a sorting direction 4.

Broadly speaking, it is noted that the combinations 1, 41, 61, 71, 81, 91, 101, 121, to be described in more detail hereunder, are each provided with an on-board driving device and an on-board control system as explained above on the basis of FIGS. 2 and 3.

Pusher body 3 in FIG. 1 is provided on each of the two pusher surfaces 8 with two styli 30, which are provided one after another in the direction of movement 5 per pusher surface 8. Each stylus 30 has a spherical head 31, a collar 32 and a compression spring 33, extending partly within a horizontal hole 34 in pusher surface 8. Under the effect of contact between the product to be sorted that is located on carrying surface 6 and a head 31 of a stylus 30, each stylus 30 is movable in the direction of the pusher surface 8, thus parallel to the sorting direction 4 relative to the pusher surface 8, against the action of compression spring 33, until collar 32 comes up against an inside wall of hole 34.

Pusher body 3 is further provided with a transmitter, not shown in more detail, which is for example battery-powered, and is configured for sending data relating to the movement of the styli 30, said movement being indicative of the distance between the product to be sorted and the pusher body 3, to the on-board control system 39 of the combination 1. This on-board control system is configured for controlling servomotor 17 as a function of the respective data but also based on data as received from the central control system of the sorting system.

Figure 4:
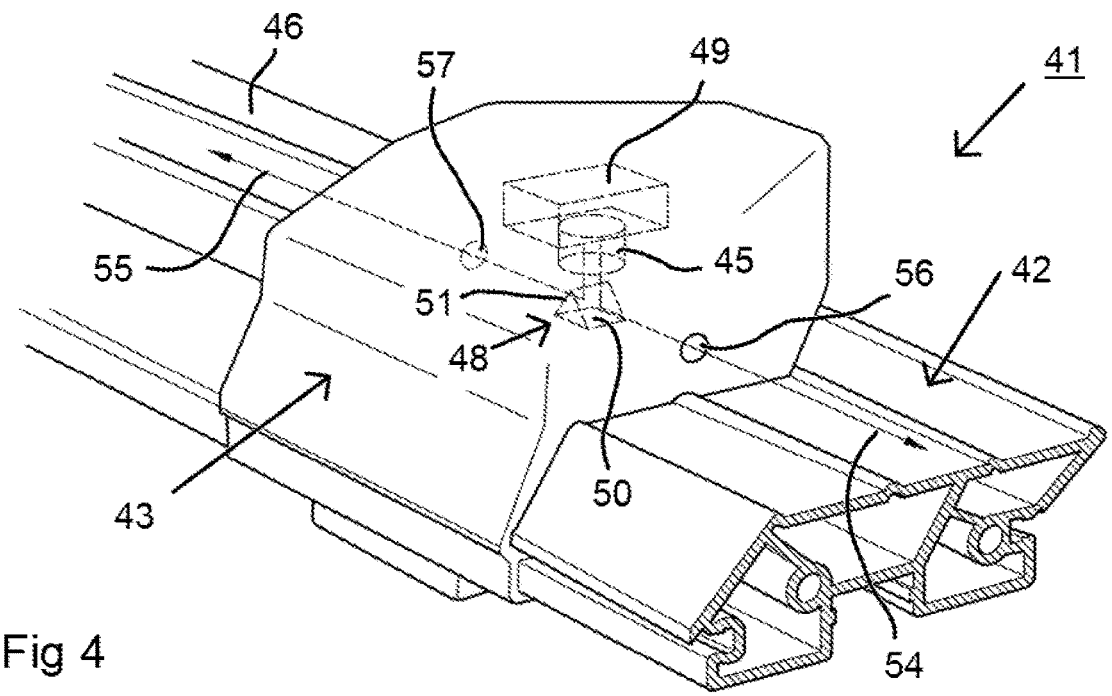
FIG. 4 shows a perspective view of a combination of a carrying body and a pusher body.

FIG. 4 shows a combination 41 of a slat 42 and a pusher shoe 43. In the interior of pusher shoe 43 above the carrying surface 46 of slat 42, pusher shoe 43 is provided with a sensor configured as photocell 45, with sensor control 49, as well as directly thereunder (at least in the orientation according to FIG. 4) a mirror body 48 with two mirror surfaces 50, 51, which are mounted symmetrically relative to each other and make an angle of 45° with the carrying surface 46. The mirror surfaces 50, 51 are oriented in such a way that light beams 52, 53 that photocell 45 emits in the direction of the carrying surface 46 perpendicular thereto are deflected on the respective mirror surfaces 50, 51 in opposite directions parallel to sorting directions 4 according to arrows 54, 55. The deflected light beams 54, 55 radiate through passage 56, 57 in the lateral surfaces 58 of pusher shoe 43. These deflected light beams 54, 55 will reflect on any product to be sorted that is supported on carrying surface 46. The reflected light beams will then arrive back at the photocell 45 via the mirror surfaces 50, 51. In operation, the photocell 45 calculates the distance between the pusher shoe 43 and the product to be sorted, based on the time delay between emission of the light beams and return of the reflected light beams. The sensor control 49 is in wireless communication with the on-board control system of the combination 41 so that, based on detection by light sensor 45, it is actuated to move pusher body 43 to and fro in sorting direction 4.

Figure 5:
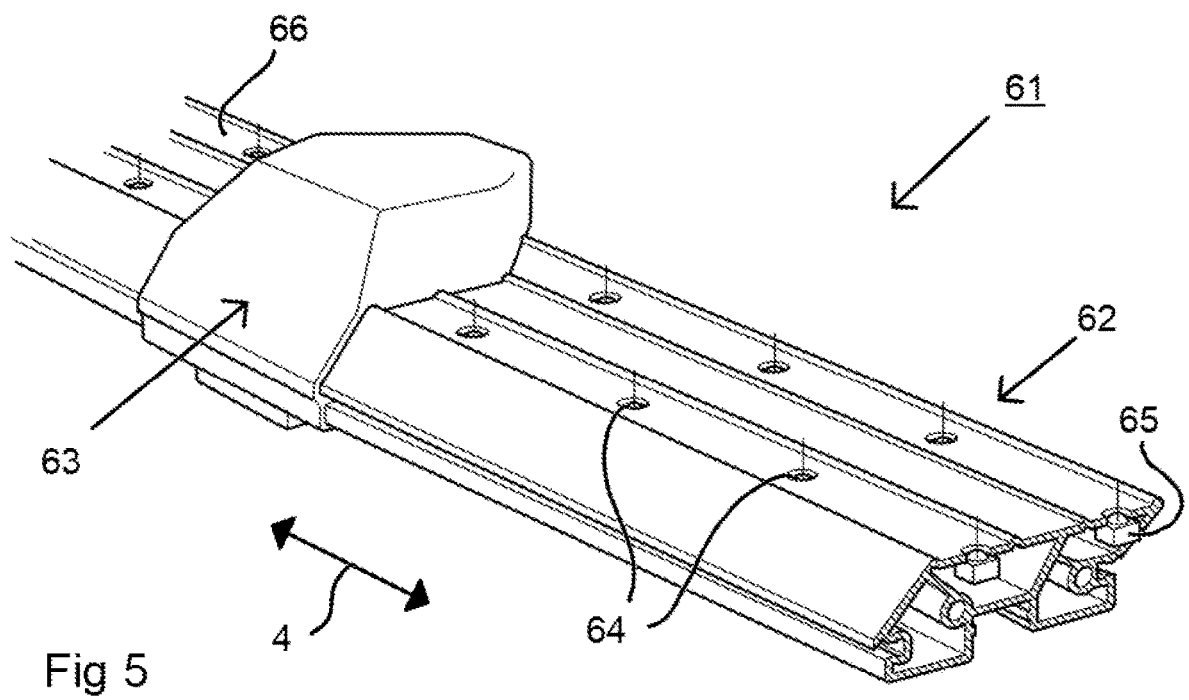
FIG. 5 shows a perspective view of a combination of a carrying body and a pusher body.

FIG. 5 shows a combination 61 of a carrying body 62 and a pusher shoe 63. In the carrying surface 66 of carrying body 62, two rows of holes 64 are provided, wherein each row extends parallel to the sorting direction 4. The holes 64 are provided at an equal distance apart, for example a distance of 5 cm. At the site of the holes 64, the combination 61 is provided per hole 64 with a light sensor configured as a photocell 65. These photocells 65 are connected to the on-board control system of combination 61 which controls the servomotor of the combination. If a product to be sorted is located above a hole 64 and thus covers it, this will be detected by the associated photocell 65 so that the on-board control knows where the product to be sorted is located on the carrying surface 66. In relation to this, the on-board control system of combination 61 controls the servomotor of combination 61.

FIG. 6 shows a top view of a part of a sorting path of a sorting system. More specifically, FIG. 6 shows a number of combinations 61 located one after another, viewed in the direction of movement 5, with a parcel 80 thereon that has crooked orientation relative to the direction of movement 5.

Figure 7:
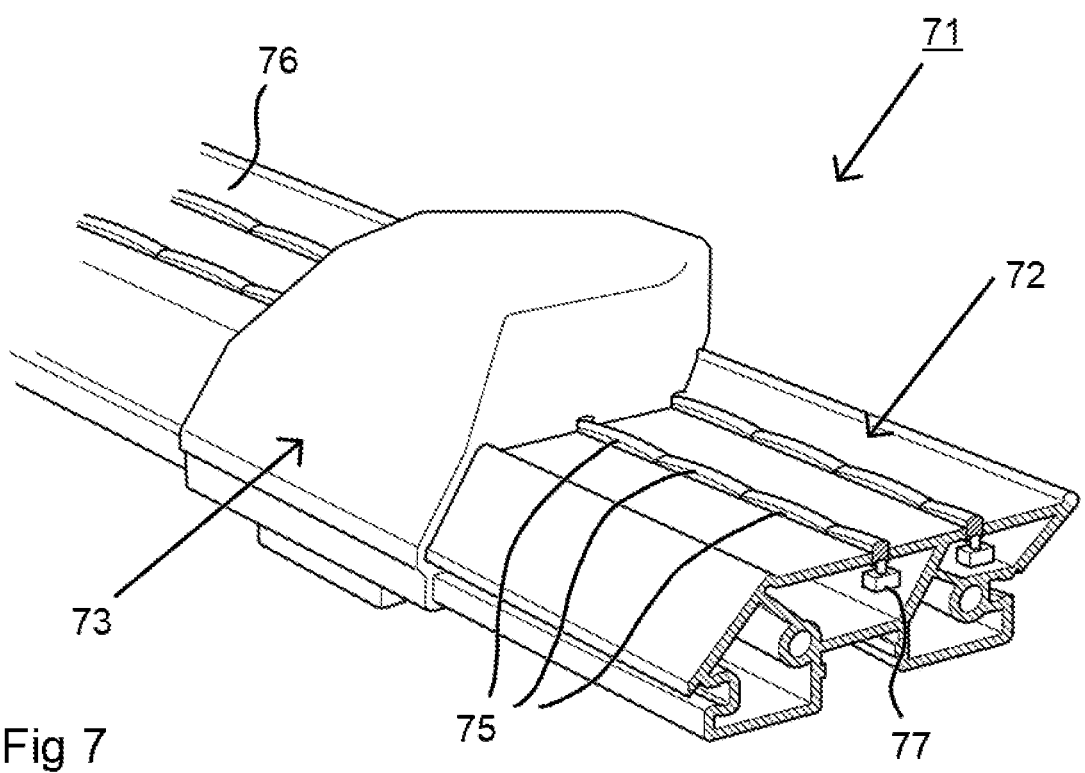
FIG. 7 shows a perspective view of a combination of a carrying body and a pusher body.

FIG. 7 shows a combination 71 of a slat 72 and a pusher shoe 73. Combination 71 may be regarded as a variant of combination 61. Instead of light sensors 65, slat 72 comprises two rows of pressure elements 75 each operating a mechanical switch 77 located thereunder. The centre to centre distance between the pressure elements 75 within a row is for example 2.5 cm. Each of the switches 77 is connected to the on-board control system of the combination 71. A product to be sorted that stands on carrying surface 76 of slat 72 presses the pressure elements 75 located thereunder downwards on account of the weight of the product and the associated switch 77 is operated. In operation, each of the switches 77 will send a relevant signal to the on-board control, so that this knows the position of the product to be sorted on the carrying surface 76 and can derive data from this relating to the distance between the pusher shoe 73 and the product to be sorted.

Figure 8:
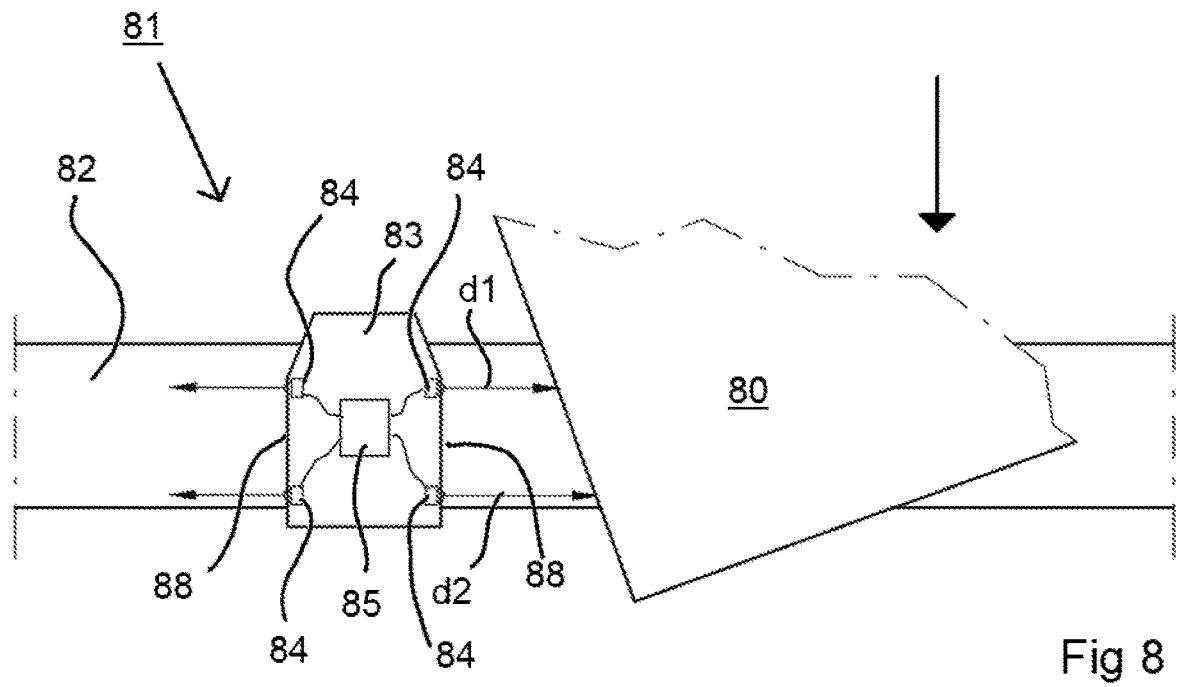
FIG. 8 shows a top view of a combination of a carrying body and a pusher body.

FIG. 8 shows a combination 81 of a slat 82 and a pusher shoe 83. Each of the pusher shoes 83 is provided on each of the two pusher surfaces 88 thereof with light sensors configured as photocell 84. Each of the photocells 84 is connected to a sensor control 85 that is provided in the housing of pusher body 3 and is configured for wireless transfer of data derived from the photocells 84 to the on-board control system of the combination 81, optionally after an initial processing of said data. The use of two photocells 84 per pusher surface 88, which are located one after another in the direction of movement 5, makes it possible for the sensor control and/or the on-board control system of the combination 81 to obtain, besides data about the distance between pusher shoe 83 and product 80, also data about the possible skew of parcel 80, as shown in FIG. 8. The distances d1 and d2 between parcel 80 and pusher shoe 83 are unequal if there is skew. The extent of inequality is a measure of the skew.

Figure 9:
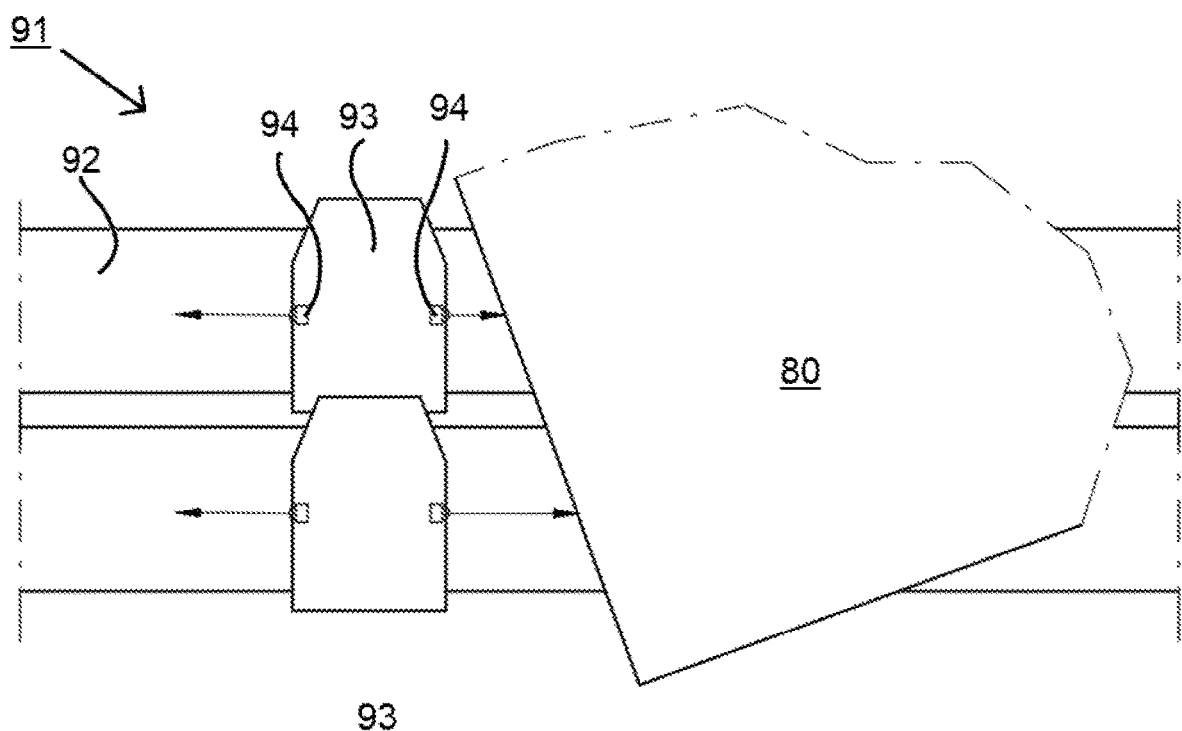
FIG. 9 shows a top view of two combinations located after one another, each of a carrying body and a pusher body.

Alternatively, it is of course also possible to use a single photocell 94 per pusher surface 98. This is shown in FIG. 9 for combination 91 with slat 92 and pusher shoe 93.

Figure 10:
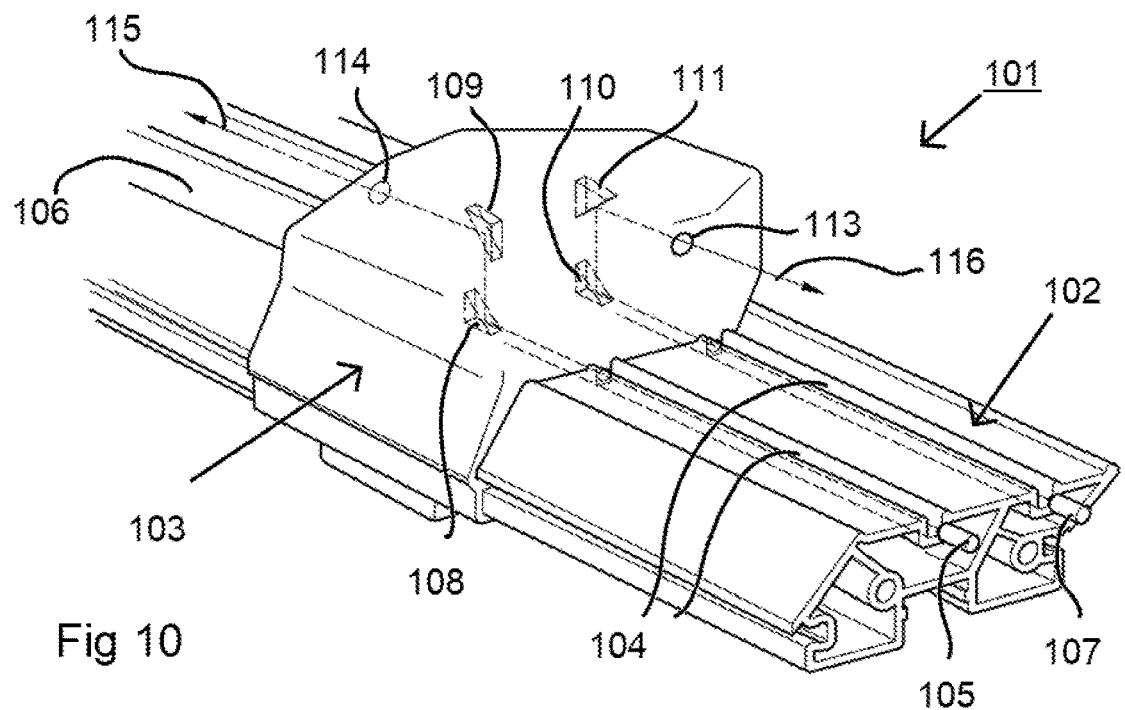
FIG. 10 shows a perspective view of a combination of a carrying body and a pusher body.
Figure 11A:
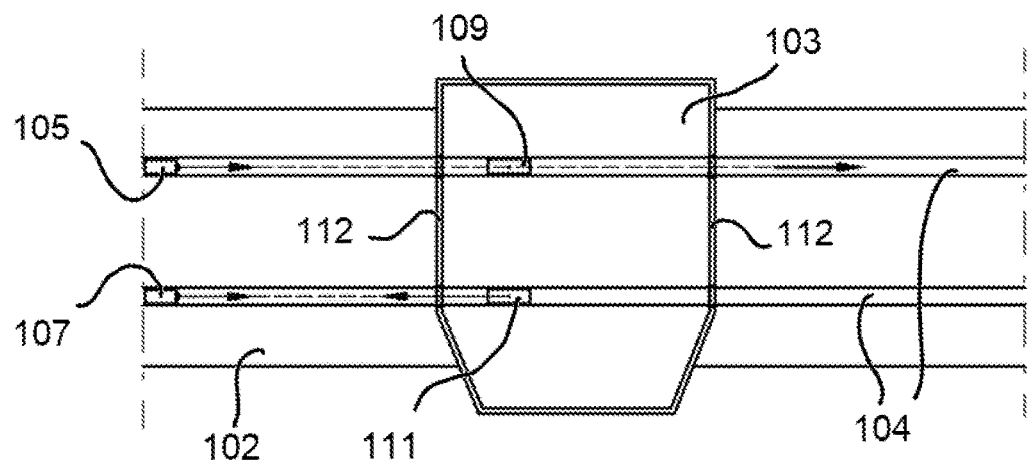
FIG. 11a shows a schematic top view of the combination according to FIG. 10.
Figure 11B:
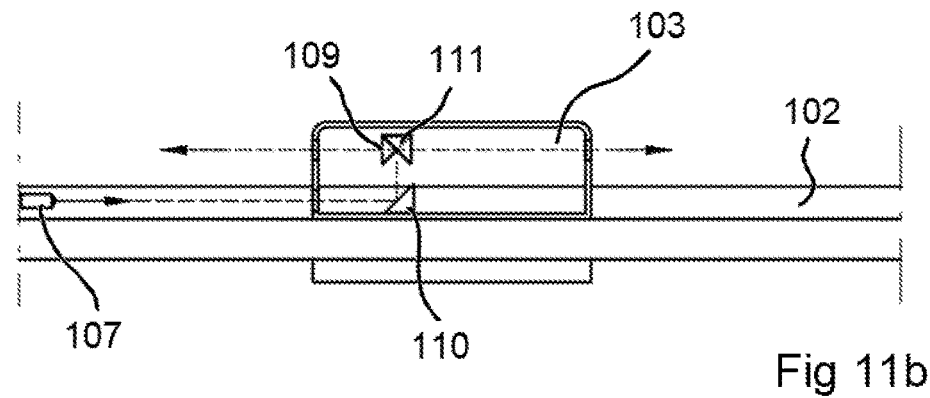
FIG. 11b shows a schematic side view of the combination according to FIG. 10.

FIGS. 10 to 11b relate to a combination 101 of a slat 102 and pusher shoe 103. Two parallel grooves 104 are provided in the carrying surface 106 of slat 102. At one end of these grooves 104, two light sensors 105, 107 configured as photocells 105, 107 are provided, which are connected to the slat 102. In FIG. 10, the light sensors 105, 107 are shown just outside the grooves 104, but they are in fact just inside, as is shown in FIGS. 11a and 11b. The photocells 105, 107 radiate light beams through grooves 103, 104 parallel to the longitudinal direction thereof. The pusher body 100 is provided with two pairs of mirrors 108, 109 and 110, 111. Passages 113, 114 are provided in the pusher surfaces 112. The light beams emitted by light sensors 105, 107 are deflected by the respective pairs of mirrors 108, 109 and 110, 111 in two oppositely directed light beams 115, 116, said deflected light beams 115, 116 are directed parallel to the sorting direction 4. By reflection on the product to be sorted that is located on the carrying surface 106, the distance between the pusher shoe 103 and the respective product to be sorted can be determined by means of the photocells 105, 107, more specifically based on the duration of a light wave or light pulse emitted by the respective photocell 105, 107.

Figure 12:
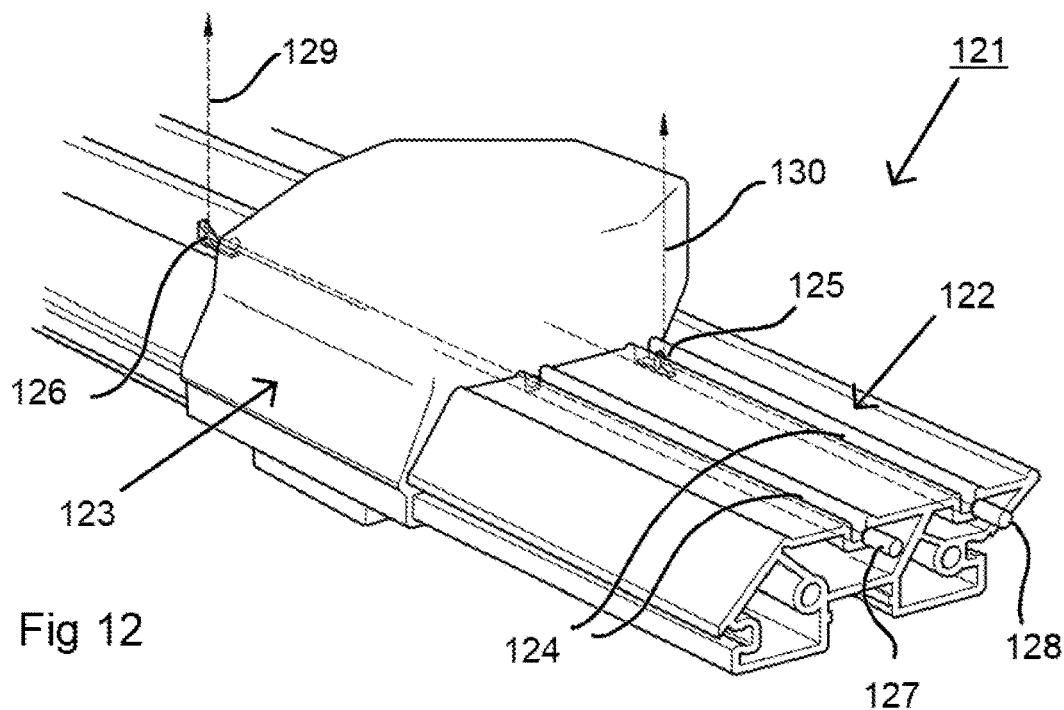
FIG. 12 shows a perspective view of a combination of a carrying body and a pusher body.
Figure 13A:
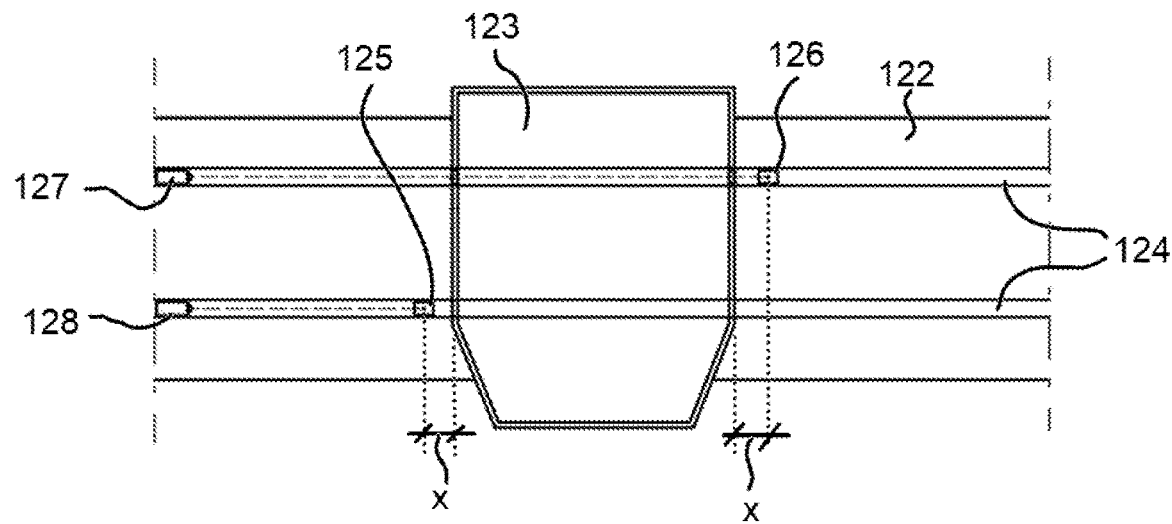
FIG. 13a shows a schematic top view of the combination according to FIG. 12.
Figure 13B:
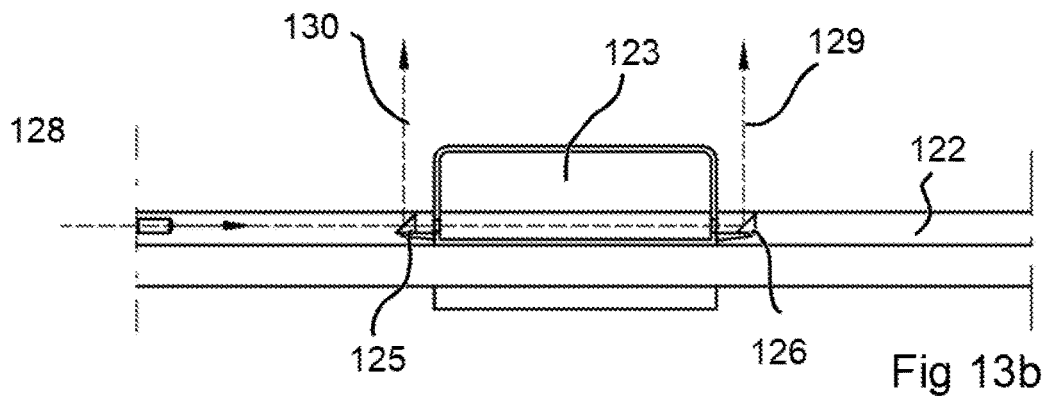
FIG. 13b shows a schematic side view of the combination according to FIG. 12.

In combination 121 according to FIGS. 12 to 13b, with slat 122 and pusher shoe 123, the pusher shoe 123 is provided with mirror bodies 125, 126. These are located within the grooves 124 just on oppositely located outer sides of pusher shoe 123. The mirror bodies 125, 126 reflect light beams from light sensors 127, 128 vertically upwards. The upwards reflected light beams 129, 130 will be blocked if a product to be sorted is above them. Thus it can be detected whether a product is within a certain distance x of pusher shoe 128.

Although in the examples discussed above the distance between a pusher shoe and a product to be sorted is detected by means of mechanical feelers, light sensors and pressure sensors, it is also possible to use other types of sensors for this, such as ultrasonic sensors or cameras.

Figure 14:
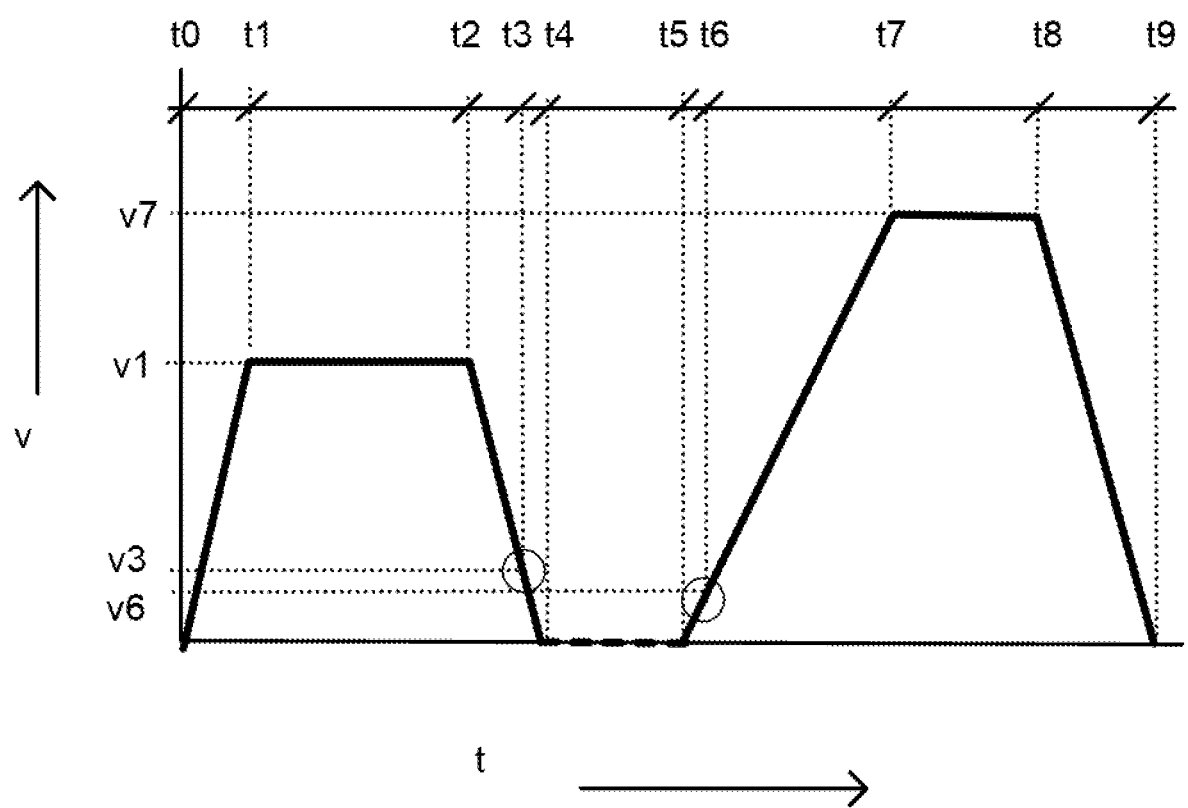
FIG. 14 shows schematically a speed profile of a pusher shoe

FIG. 14 relates to speed profiles of pusher shoes viewed in the sorting direction. The respective graph is not to scale. The time t is plotted on the horizontal axis, and the speed v is plotted on the vertical axis.

In the period t0-t1, the pusher shoe accelerates from a first end of the associated slat up to speed v1. In the period t1-t2 the pusher shoe moves further in the direction of the product to be sorted at a constant speed v2. In the period t2-t4 the pusher shoe slows down from speed v2 to a stop. In one example, during the period t2-t4, namely at time point t3, the pusher shoe with a speed v3 comes into contact with the product to be sorted. The magnitude of v3 is less than 1.5 m/sec, for example 0.5 m/sec. In the period t3-t4 the pusher shoe will push the product to be sorted already somewhat forwards over the slat. In the period t4-t5 the pusher shoe (viewed in the sorting direction) is stationary, wherein the product to be sorted is up against the pusher shoe. In the period t5-7 the pusher shoe accelerates from stationary to speed v7, for example at a magnitude of 2.5 m/sec. In this example, v7 is greater than v1. In the period t7-t8 the pusher shoe moves further at constant speed v7. In the period t8-t9 the pusher shoe slows down from speed v7 to a stop. In the period t5-t8 the pusher shoe pushes the product to be sorted further (this was also the case in the period t3-t4) from off the slat. At the time point t9 the pusher shoe is at the second end of the slat, located opposite the first end, and the product to be sorted has been pushed off of the slat completely.

The magnitude of the period t5-t9 is calculated by the on-board control system based on the position of the pusher shoe viewed in the sorting direction relative to the slat at time point t4 (or t5). Time point t5 is calculated by the on-board control system based on the distance to the sorting location still to be travelled where the product to be sorted should be sorted out, and the speed of movement of the respective combination. Time point t2 is calculated by the on-board control system based on the distance parameter such as is determined by the distance-determining device of the respective combination and is received by the on-board control system from the distance-determining device. In this calculation of t2, the starting point in the present example is that v3 is so low that the risk of damaging the product to be sorted on account of the pusher shoe coming into contact with the product to be sorted is small or is even excluded. In the example selected, the period t0-t3 may be regarded as the phase in which the pusher shoe moves towards the product to be sorted, and the period t3-t9 may be regarded as the period in which the product to be sorted is pushed from the slat by the pusher shoe. During the period t3-t9, in fact the pusher shoe is stationary in the period t4-t5. Time point t3 may be regarded as an intermediate phase (in fact a moment and not a time interval) in which the pusher shoe comes into contact with the product to be sorted.

In an alternative example, contact between the pusher shoe and the product to be sorted takes place at time point t6 instead of at time point t3, and at this time point t6 the pusher shoe has speed v6, for example with a magnitude of 0.4 m/sec.

In a further alternative example, the pusher shoe is not slowed to a stop during period t2-t4 but to a relatively low speed of for example 0.1 m/sec, and this speed is maintained until t5, after which the pusher shoe accelerates. In the present example, contact with the product to be sorted may occur in the period t4-t5.

In yet another alternative example, the pusher shoe accelerates from t0 to a relatively low speed, for example 0.1 m/sec, and this speed is maintained from t1 to a time point t2. In the present example, contact with the product to be sorted may occur in the period t1-t2. After contact, the pusher shoe may for example first slow down to a stop and then accelerate again from t5 to speed v7 or accelerate without an intermediate stop from t5 to speed v7.

As a further variant, it is also possible for an at least substantially box-shaped product to be sorted, with a side extending in parallel to the direction of movement 5, to be supplied to the respective sorting system, more specifically to a combined carrying surface such as is formed by carrying surfaces of a number of successive elongated parallel slats thereof. Successive parcels may thus be supplied relatively closely one after another to the sorting system. A product to be sorted may then first be pushed parallel from the row of successive products to be sorted and as soon as there is sufficient space, be turned by a coordinated driving of the pusher shoes, so that it can be sorted in a narrow outlet at the site of a sorting location.

The invention claimed is:

1. A sorting system for sorting products comprising:
a central control system;
a plurality of successive assemblies, located one after another, each of the assemblies including an elongated carrying body and a pusher body movable in a direction of movement following a path along which a plurality of sorting locations are provided;
wherein the carrying bodies extend parallel to each other and perpendicular to the direction of movement and each one of the carrying bodies is configured to carry a product to be sorted, the sorting system further comprising a displacing device for moving the assemblies in the direction of movement along the path, each of the assemblies further including a further displacing device that is provided with an on-board driving device for moving the pusher body in a sorting direction along the carrying body, extending perpendicularly to the direction of movement, for pushing a product carried by the carrying body off of the carrying body with the pusher body, as well as with an on-board control system that is configured to receive destination data emanating from the central control system relating to the sorting location where a product to be sorted should be pushed off of the carrying body and for driving the on-board driving device hereto; and
a distance-determining device that is configured to determine a distance parameter that is related to the, or at least a, distance viewed in the sorting direction between the pusher body of the assembly, of which the carrying body carries a product to be sorted and the product to be sorted carried by the carrying body and for sending the distance parameter to the on-board control system and wherein the on-board control system is configured to control the on-board driving device of the assembly based on the distance parameter,
wherein the distance-determining device comprises, for at least some of the assemblies, an on-board distance-determining device that is provided with a sensor assembly with at least one sensor, said on-board distance-determining device being configured to determine the distance parameter and for sending the distance parameter directly to the on-board control system.

2. The sorting system according to claim 1, wherein the distance-determining device is also configured to determine an orientation parameter that is related to an orientation of the product to be sorted carried by the carrying body relative to the direction of movement wherein the on-board control system is configured to control the on-board driving device of the assembly based on the orientation parameter.

3. The sorting system according to claim 1, wherein the distance-determining device comprises an on-board distance-determining device for each assembly.

4. The sorting system according to claim 1, wherein the sensor of the sensor assembly of the on-board distance-determining device of the assembly forms part of the pusher body of the assembly.

5. The sorting system according to claim 1, wherein the sensor of the sensor assembly of the on-board distance-determining device of the assembly forms part of the carrying body of the assembly.

6. The sorting system according to claim 1, wherein the sensor assembly of an on-board distance-determining device of the assembly comprises at least two sensors that are provided one after another, viewed in the direction of movement.

7. The sorting system according to claim 6, wherein the on-board distance-determining device of the assembly is configured, viewed in a direction parallel to the sorting direction, on two oppositely located sides of the pusher body of the assembly, so as to be able to determine the distance between the pusher body and a product to be sorted carried by the carrying body of the assembly.

8. The sorting system according to claim 7, wherein the sensor assembly of an on-board distance-determining device of the assembly comprises at least two sensors which, viewed in a direction parallel to the sorting direction, are provided on two oppositely located sides of the pusher body of the assembly.

9. The sorting system according to claim 1, wherein the sensor assembly of an on-board distance-determining device belonging to the assembly is also provided with a mirror body with at least one mirror surface for reflecting, in the direction of the at least a sensor of the sensor assembly, a signal received from a product to be sorted carried by the carrying body of the assembly.

10. The sorting system according to claim 9, wherein the sensor assembly is provided with a mirror body with at least two mirror surfaces or with two mirror bodies each with at least one mirror surface wherein two mirror surfaces of the at least two mirror surfaces are configured to reflect signals received from two opposite directions, extending parallel to the sorting direction.

11. The sorting system according to claim 10, wherein the mirror body, the mirror bodies or some of the mirror bodies of the sensor assembly of an on-board distance-determining device belonging to the assembly, form part of the pusher body of the assembly.

12. The sorting system according to claim 1, wherein the sensor assembly of an on-board distance-determining device belonging to the assembly is provided with a light source for emitting a light signal to a product to be sorted carried by the carrying body of the assembly.

13. The sorting system according to claim 1, wherein each on-board distance-determining device of the assembly comprises an on-board position-determining unit that is configured to determine a position parameter that is related to the position viewed in the sorting direction of the pusher body of the assembly relative to the carrying body of the assembly and for sending the position parameter to the on-board control system and wherein the on-board distance-determining device comprises presence sensors that form part of the carrying body of the assembly and are provided distributed over a length of the carrying body in at least one row, said presence sensors being configured to detect whether a product to be sorted is at rest at a site of the respective presence sensor on the carrying body and for sending presence data relating to the presence of a product to be sorted at the site of the respective presence sensor to the on-board control system wherein the distance-determining device is configured to determine the distance parameter based on the presence data as well as the position parameter.

14. The sorting system according to claim 13, wherein the presence sensors are provided in at least two parallel rows.

15. The sorting system according to claim 13, wherein the presence sensors are pressure sensors.

16. The sorting system according to claim 13, wherein the presence sensors are light sensors.

17. The sorting system according to claim 13, wherein an average distance between adjacent presence sensors in a row is at most 6 cm.

18. The sorting system according to claim 1, wherein the centre to centre distance of adjacent carrying bodies viewed in the direction of movement is between 10 cm and 40 cm.

19. The sorting system according to claim 1, wherein the distance-determining device comprises an off-board distance-determining device that is installed along the path, said off-board distance-determining device being configured to determine the distance between a pusher body of the assembly and a product to be sorted that is carried by the carrying body of the respective assembly and for sending distance data relating to this distance.

20. The sorting system according to claim 19, wherein the off-board distance-determining device comprises a camera that is installed above the path.

21. A method of using a sorting system according to claim 1, comprising:
supplying a product to be sorted to the sorting system so that the product to be sorted is carried by at least two adjacent carrying bodies of associated assemblies;
receiving, by the on-board control systems of the assemblies of the central control system, of destination data relating to the sorting location where the product to be sorted should be pushed off by the pusher bodies from the assemblies of the carrying body of the assemblies;
determination of distance parameters by the distance-determining devices;
sending of distance parameters by the distance-determining devices to the on-board control systems; and
controlling of the on-board drive devices of the assemblies by the on-board control systems based on the distance parameters in such a way that each pusher shoe of the assemblies moves successively in the sorting direction towards the product to be sorted during a first phase, comes into contact with the product to be sorted during a second phase, and pushes off the product to be sorted in the sorting direction from the associated carrying body during a third phase.

22. The method according to claim 21, wherein a speed with which the pusher shoe comes into contact with the product to be sorted during the second phase is less than or equal to 1.5 m/sec, is preferably less than or equal to 1.0 m/sec.

23. The method according to claim 21, wherein a maximum speed of the pusher shoe viewed in the sorting direction during the third phase is greater than the speed with which the pusher shoe comes into contact with the product to be sorted during the second phase.

24. The method according to claim 21, wherein the maximum speed of the pusher shoe viewed in the sorting direction during the third phase is greater than the maximum speed of the pusher shoe viewed in the sorting direction during the first phase.

25. The method according to claim 21, wherein the on-board control systems based on the distance parameters control the on-board drive devices of the assemblies in such a way that at least one of the pusher shoes of the assemblies is stationary relative to the associated carrying body either between a start of the first phase and the second phase, or between the second phase and an end of the third phase.

* * * * *